(12) United States Patent
Hart et al.

(10) Patent No.: US 7,399,546 B2
(45) Date of Patent: Jul. 15, 2008

(54) SOLID OXIDE FUEL CELL

(75) Inventors: Nigel T Hart, Derby (GB); Gary J Wright, Derby (GB); Gerard D Agnew, Derby (GB); Mark Cassidy, Sunnyvale, CA (US)

(73) Assignee: Rolls-Royce plc, London (GB)

( * ) Notice: Subject to any disclaimer, the term of this patent is extended or adjusted under 35 U.S.C. 154(b) by 152 days.

(21) Appl. No.: 11/312,377

(22) Filed: Dec. 21, 2005

(65) Prior Publication Data

US 2006/0099473 A1    May 11, 2006

Related U.S. Application Data

(63) Continuation of application No. PCT/GB2004/002594, filed on Jun. 18, 2004.

(51) Int. Cl.
*H01M 8/10* (2006.01)

(52) U.S. Cl. .................................................. 429/33

(58) Field of Classification Search ............ 429/30, 429/33, 46
See application file for complete search history.

(56) References Cited

U.S. PATENT DOCUMENTS 5,171,645 A    12/1992  Khandkar
5,543,239 A *   8/1996  Virkar et al. .................. 429/33
6,558,831 B1    5/2003  Doshi
2002/0081762 A1*  6/2002  Jacobson et al. .............. 438/32

FOREIGN PATENT DOCUMENTS

| EP | 1 170 812 A | 1/2002 |
| GB | 1 591 898 SP | 7/1981 |
| JP | 61198568 AB | 9/1986 |
| JP | 02295068 AB | 12/1990 |
| WO | WO 01/86030 A | 11/2001 |

* cited by examiner

*Primary Examiner*—Susy Tsang-Foster
*Assistant Examiner*—Maria J Laios
(74) *Attorney, Agent, or Firm*—W. Warren Taltavull; Manelli Denison & Selter PLLC

(57) ABSTRACT

A solid oxide fuel cell (10) comprises an anode electrode (12), a cathode electrode (14) and an electrolyte (16) between the anode electrode (12) and the cathode electrode (14). A gaseous fuel is supplied to an anode chamber (18) partially defined by the anode electrode (12) and a gaseous oxidant is supplied to a cathode chamber (20) partially defined by the cathode electrode (14). The electrolyte (16) comprises a first dense non-porous layer (22), a second porous layer (24) on the first dense non-porous layer (22) and a third dense non-porous layer (26) on the second porous layer (24). The anode electrode (12) is arranged on the first dense non-porous layer (22) and the cathode electrode (14) is arranged on the third dense non-porous layer (26). The second porous layer (24) acts as a buffer between the first dense non-porous layer (22) and the third dense non-porous layer (26) to prevent defects propagating between the layers (22,26) and to prevent fuel and oxidant leaking through the electrolyte (16).

13 Claims, 1 Drawing Sheet

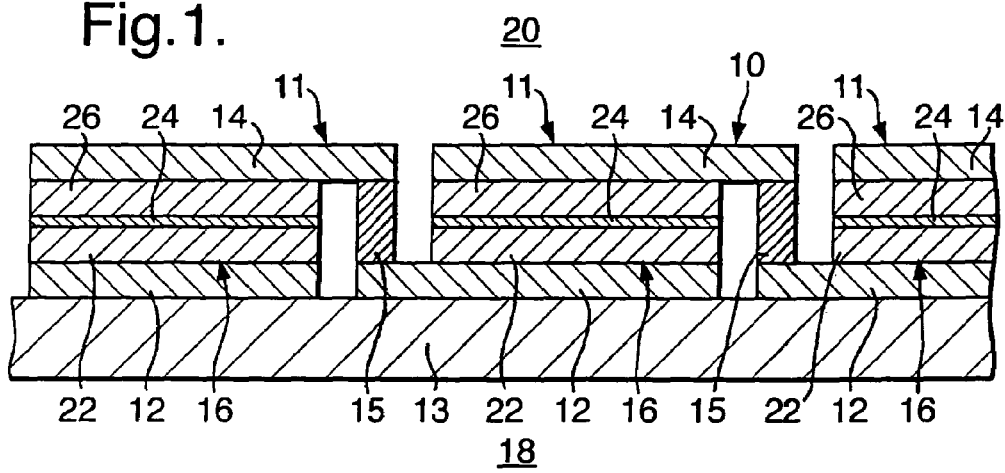
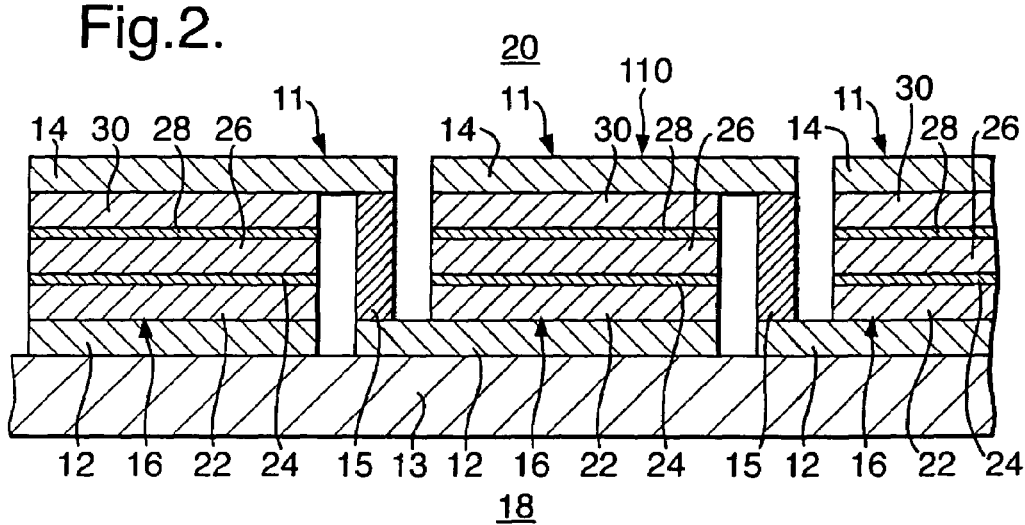
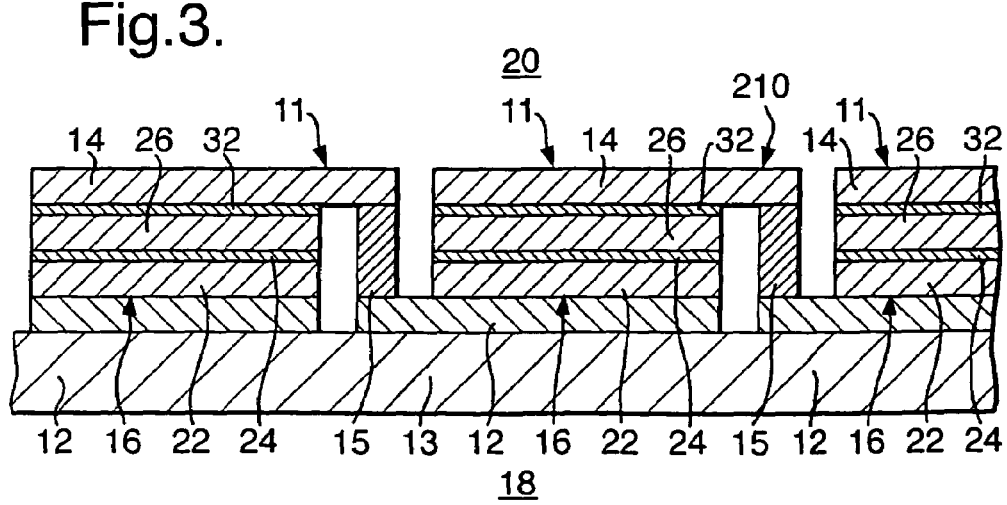

SOLID OXIDE FUEL CELL

This is a continuation of International Application Number PCT/GB2004/002594 filed Jun. 18, 2004, designating the United States.

FIELD OF THE INVENTION

The present invention relates to a solid oxide fuel cell and a solid oxide fuel cell stack.

BACKGROUND OF THE INVENTION

A solid oxide fuel cell comprises an anode electrode, a cathode electrode and an electrolyte between the anode electrode and the cathode electrode. A solid oxide fuel cell stack comprises a plurality of solid oxides connected in electrical series or in electrical parallel arrangements. In a solid oxide fuel cell a gaseous fuel, for example hydrogen, is supplied to the anode electrode and a gaseous oxidant, for example oxygen or air, is supplied to the cathode electrode.

The electrolyte of a solid oxide fuel cell is required to form a physical barrier between the gaseous fuel supplied to the anode electrode and the gaseous oxidant supplied to the cathode electrode. The electrolyte comprises a dense non-porous layer. Any gaseous leak paths through the electrolyte between the anode electrode and the cathode electrode will allow the gaseous fuel and oxidant to come into contact. This leakage produces a reduction in the solid oxide fuel cell performance in terms of fuel utilisation and may detrimental to mechanical integrity and durability of the solid oxide fuel cell. It may even result in combustion of the gaseous fuel in the gaseous oxidant and possibly severe damage to the solid oxide fuel cell.

The electrolyte, in practice, has defects, or flaws, in its microstructure. These defects, or flaws, may be caused by contamination and/or variability in the manufacturing process. It may be possible to minimise these defects, or flaws, by implementing greater manufacturing process control, however, complete elimination of the defects, or flaws, is likely to result in a tightly controlled manufacturing process and hence an expensive manufacturing process.

One possible solution to the problem was to provide a further dense non-porous layer on the existing dense non-porous layer of the electrolyte. However, in practice the original defects in the dense non-porous layer propagate into the further dense non-porous layer resulting in no benefit.

SUMMARY OF THE INVENTION

Accordingly the present invention seeks to provide a novel solid oxide fuel cell and a novel solid oxide fuel cell stack, which reduces, preferably overcomes, the above-mentioned problems.

Accordingly the present invention provides a solid oxide fuel cell comprising an anode electrode, a cathode electrode and an electrolyte between the anode electrode and the cathode electrode, the electrolyte comprising a first dense non-porous layer, a second porous layer on the first dense non-porous layer and a third dense non-porous layer on the second porous layer.

The electrolyte may comprise a fourth porous layer on the third dense non-porous layer and a fifth dense non-porous layer on the fourth porous layer.

A porous layer may be arranged between the electrolyte and the anode electrode.

A porous layer may be arranged between the electrolyte and the cathode electrode.

Preferably the first, second and third layers of the electrolyte have the same composition.

At least one of the layers of the electrolyte may comprise gadolinia-doped ceria. All the layers of the electrolyte may comprise gadolinia-doped ceria.

At least one of the layers of the electrolyte may comprise scandia-doped zirconia. All the layers of the electrolyte may comprise scandia-doped zirconia.

The present invention also provides a solid oxide fuel cell stack may comprise a plurality of solid oxide fuel cells, each solid oxide fuel cell comprising an anode electrode, a cathode electrode and an electrolyte between the anode electrode and the cathode electrode, each electrolyte comprising a first dense non-porous layer, a second porous layer on the first dense non-porous layer and a third dense non-porous layer on the second porous layer.

BRIEF DESCRIPTION OF THE DRAWINGS

The present invention will be more fully described by way of example with reference to the accompanying drawings in which:—

FIG. 1 shows a solid oxide fuel cell stack according to the present invention.

FIG. 2 shows a further solid oxide fuel cell stack according to the present invention.

FIG. 3 shows another solid oxide fuel cell stack according to the present invention.

DETAILED DESCRIPTION OF THE INVENTION

A solid oxide fuel cell stack 10, as shown in FIG. 1, comprises a plurality of solid oxide fuel cells 11. Each solid oxide fuel cell 11 comprises an anode electrode 12, a cathode electrode 14 and an electrolyte 16 between the anode electrode 12 and the cathode electrode 14. A gaseous fuel, for example hydrogen, is supplied to an anode chamber 18 partially defined by the anode electrode 12 and a gaseous oxidant, for example oxygen or air, is supplied to a cathode chamber 20 partially defined by the cathode electrode 14.

The solid oxide fuel cells 11 are arranged on a support structure 13 with the anode electrodes 12 in contact with the support structure 13. The support structure 13 has porous regions to allow gaseous fuel to flow to the anode electrodes 12. Adjacent solid oxide fuel cells 11 are connected in series by interconnectors 15, which interconnect an anode electrode 12 of one solid oxide fuel cell 11 with a cathode electrode 14 of an adjacent solid oxide fuel cell 11.

The electrolyte 16 comprises a first dense non-porous layer 22, a second porous layer 24 on the first dense non-porous layer 22 and a third dense non-porous layer 26 on the second porous layer 24. The anode electrode 12 is arranged on the first dense non-porous layer 22, between the first dense non-porous layer 22 and the support structure 13, and the cathode electrode 14 is arranged on the third dense non-porous layer 26.

The result of this arrangement of electrolyte 16 is that the effect of a defect in the first dense non-porous layer 22 is not transferred to the third dense non-porous layer 26 because the second porous layer 24 acts as a buffer between the first dense non-porous layer 22 and the third dense non-porous layer 26. Similarly, a defect in the third dense non-porous layer 26 is not transferred to the first dense non-porous layer 22 because the second porous layer 24 acts as a buffer between the third dense non-porous layer 26 and the first dense non-porous layer 22. Thus this arrangement minimises the formation of leak paths through the electrolyte 16 between the anode chamber 18 and the cathode chamber 20.

A solid oxide fuel cell stack 110, as shown in FIG. 2, comprises a plurality of solid oxide fuel cells 11. Each solid oxide fuel cell 11 comprises an anode electrode 12, a cathode electrode 14 and an electrolyte 16 between the anode electrode 12 and the cathode electrode 14. A gaseous fuel, for example hydrogen, is supplied to an anode chamber 18 partially defined by the anode electrode 12 and a gaseous oxidant, for example oxygen or air, is supplied to a cathode chamber 20 partially defined by the cathode electrode 14.

The solid oxide fuel cells 11 are arranged on a support structure 13 with the anode electrodes 12 in contact with the support structure 13. The support structure 13 is porous regions to allow gaseous fuel to flow to the anode electrodes 12. Adjacent solid oxide fuel cells 11 are connected in series by interconnectors 15, which interconnect an anode electrode 12 of one solid oxide fuel cell 11 with a cathode electrode 14 of an adjacent solid oxide fuel cell 11.

The electrolyte 16 comprises a first dense non-porous layer 22, a second porous layer 24 on the first dense non-porous layer 22, a third dense non-porous layer 26 on the second porous layer 24, a fourth porous layer 28 on the third dense non-porous layer 26 and a fifth dense non-porous layer 30 on the fourth porous layer 28. The anode electrode 12 is arranged on the first dense non-porous layer 22, between the first dense non-porous layer 22 and the support structure 13, and the cathode electrode 14 is arranged on the fifth dense non-porous layer 30.

The result of this arrangement of electrolyte 16 is that the second porous layer 24 acts as a buffer between the first dense non-porous layer 22 and the third dense non-porous layer 26 as described above with reference to FIG. 1. Similarly, the fourth porous layer 28 acts as a buffer between the third dense non-porous layer 26 and the fifth dense non-porous layer 30. Thus this arrangement minimises the formation of leak paths through the electrolyte 16 between the anode chamber 18 and the cathode chamber 20.

A solid oxide fuel cell stack 210, as shown in FIG. 3, comprises a plurality of solid oxide fuel cells 11. Each solid oxide fuel cell 11 comprises an anode electrode 12, a cathode electrode 14 and an electrolyte 16 between the anode electrode 12 and the cathode electrode 14. A gaseous fuel, for example hydrogen, is supplied to an anode chamber 18 partially defined by the anode electrode 12 and a gaseous oxidant, for example oxygen or air, is supplied to a cathode chamber 20 partially defined by the cathode electrode 14.

The solid oxide fuel cells 11 are arranged on a support structure 13 with the anode electrodes 12 in contact with the support structure 13. The support structure 13 is porous regions to allow gaseous fuel to flow to the anode electrodes 12. Adjacent solid oxide fuel cells 11 are connected in series by interconnectors 15, which interconnect an anode electrode 12 of one solid oxide fuel cell 11 with a cathode electrode 14 of an adjacent solid oxide fuel cell 11.

The electrolyte 16 comprises a first dense non-porous layer 22, a second porous layer 24 on the first dense non-porous layer 22 and a third dense non-porous layer 26 on the second porous layer 24. A fourth porous layer 32 is arranged on the third dense non-porous layer 26. The anode electrode 12 is arranged on the first dense non-porous layer 22, between the first dense non-porous layer 22 and the support structure 13, and the cathode electrode 14 is arranged on the fourth porous layer 32.

The result of this arrangement of electrolyte 16 is that the second porous layer 24 acts as a buffer between the first dense non-porous layer 22 and the third dense non-porous layer 26. Similarly, the fourth porous layer 32 acts as a buffer between the third dense non-porous layer 26 and the cathode electrode 14. Thus this arrangement minimises the formation of leak paths through the electrolyte 16 between the anode chamber 18 and the cathode chamber 20.

As a further alternative it may be possible to provide a porous layer to act as buffer between the first dense non-porous layer 22 and the anode electrode 14.

As other alternatives it may be possible to provide a porous layer between the anode electrode and the electrolyte and a porous layer between the cathode electrode and the electrolyte in either or both of FIGS. 1 and 2.

The first, second and third layers of the electrolyte may have the same composition or may have different compositions.

One of the layers of the electrolyte may comprise yttria stabilised zirconia, 92 wt % zirconia and 8 wt % yttria, and in some instances all of the layers of the electrolyte comprise yttria stabilised zirconia.

The inclusion of the second porous layer of electrolyte increases the ionic resistance across the electrolyte and therefore the use of a higher conductivity electrolyte material is beneficial. Suitable higher conductivity materials for the electrolyte are scandia-doped zirconia and gadolinia-doped ceria.

Alternatively one or all of the layers of the electrolyte may comprise scandia-doped zirconia. As a further alternative one or all of the layers of the electrolyte may comprise gadolinia-doped ceria.

The anode electrode, the layers of the electrolyte and the cathode electrode are deposited by screen-printing, spraying, tapecasting or inkjet printing. The fuel cells are generally arranged on a support structure, such that either the anode electrodes are initially deposited on the support structure and then the remaining layers or alternatively the cathode electrodes are deposited on the support structure and then the remaining layers.

The support structure may comprise a magnesium aluminate spinel.

The invention claimed is:

1. A solid oxide fuel cell comprising an anode electrode, a cathode electrode and an electrolyte between the anode electrode and the cathode electrode, characterized in that the electrolyte comprises a first dense non-porous layer, a second porous layer on the first dense non-porous layer and a third dense non-porous layer on the second porous layer.

2. A solid oxide fuel cell as claimed in claim 1 comprising a porous layer between the electrolyte and the anode electrode.

3. A solid oxide fuel cell as claimed in claim 2 comprising a porous layer between the electrolyte and the cathode electrode.

4. A solid oxide fuel cell as claimed in claim 1 comprising a porous layer between the electrolyte and the cathode electrode.

5. A solid oxide fuel cell as claimed in claim 1 wherein the first, second and third layers of the electrolyte have the same composition.

6. A solid oxide fuel cell as claimed in claim 1 wherein at least one of the layers of the electrolyte comprises gadolinia-doped ceria.

7. A solid oxide fuel cell as claimed in claim 6 wherein all the layers of the electrolyte comprise gadolinia-doped ceria.

8. A solid oxide fuel cell as claimed in claim 1 wherein at least one of the layers of the electrolyte comprises scandia-doped zirconia.

9. A solid oxide fuel cell as claimed in claim 8 wherein all the layers of the electrolyte comprise scandia-doped zirconia.

10. A solid oxide fuel cell stack comprising a plurality of solid oxide fuel cells as claimed in claim 1.

11. A solid oxide fuel cell stack comprising a plurality of solid oxide fuel cells, each solid oxide fuel cell comprising an anode electrode, a cathode electrode and an electrolyte between the anode electrode and the cathode electrode, each electrolyte comprising a first dense non-porous layer, a second porous layer on the first dense non-porous layer and a third dense non-porous layer on the second porous layer.

12. A solid oxide fuel cell comprising an anode electrode, a cathode electrode and an electrolyte between the anode electrode and the cathode electrode, characterized in that the electrolyte comprising a first dense non-porous layer, a second porous layer on the first dense non-porous layer and a third dense non-porous layer on the second porous layer wherein the first, second and third layers of the electrolyte have the same composition.

13. A solid oxide fuel cell comprising an anode electrode, a cathode electrode and an electrolyte between the anode electrode and the cathode electrode, characterized in that the electrolyte comprises a first dense non-porous layer, a second porous layer on the first dense non-porous layer and a third dense non-porous layer on the second porous layer wherein the electrolyte comprises a fourth porous layer on the third dense non-porous layer and a fifth dense non-porous layer on the fourth porous layer.

* * * * *